Patented Aug. 10, 1954

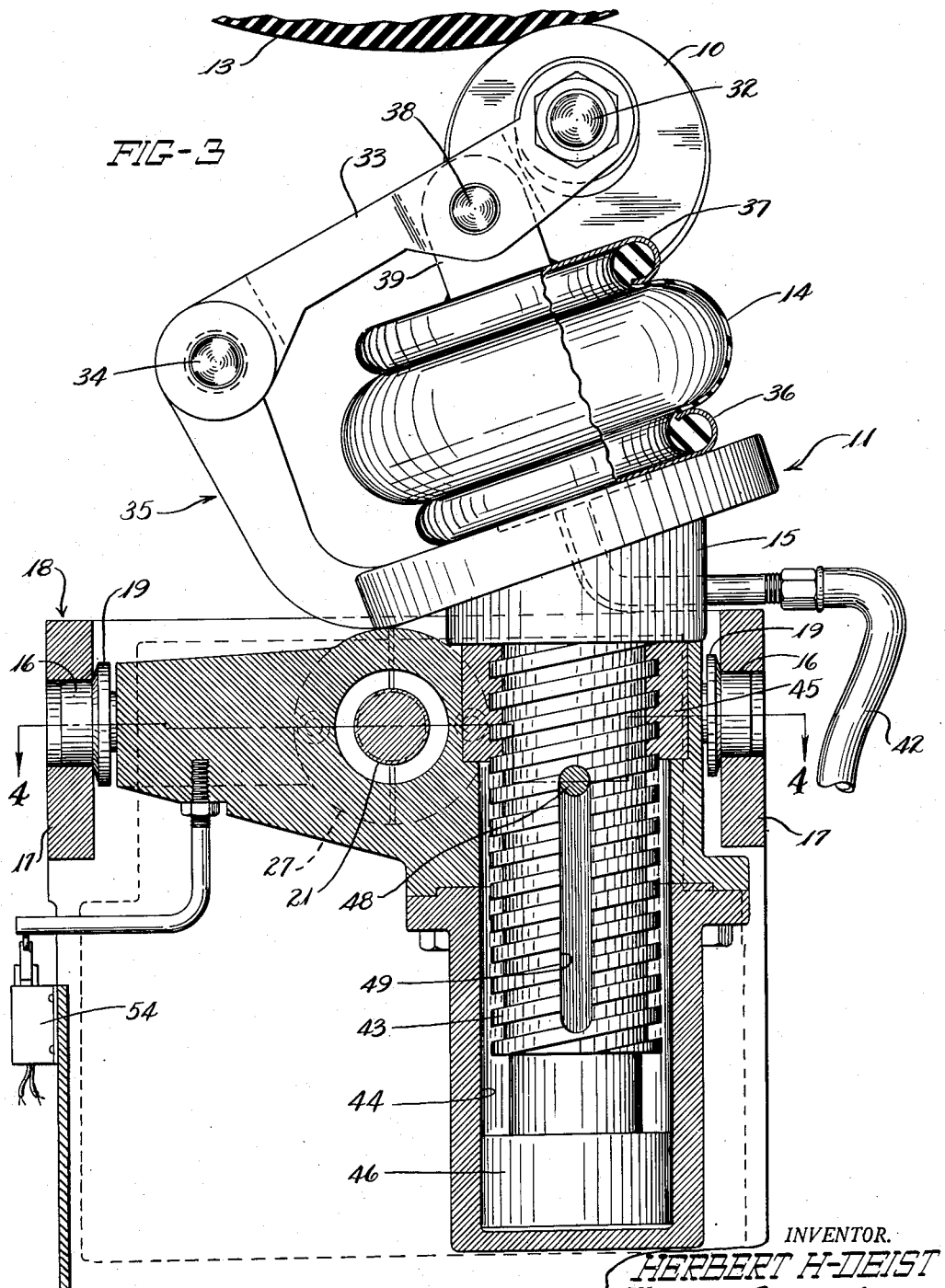

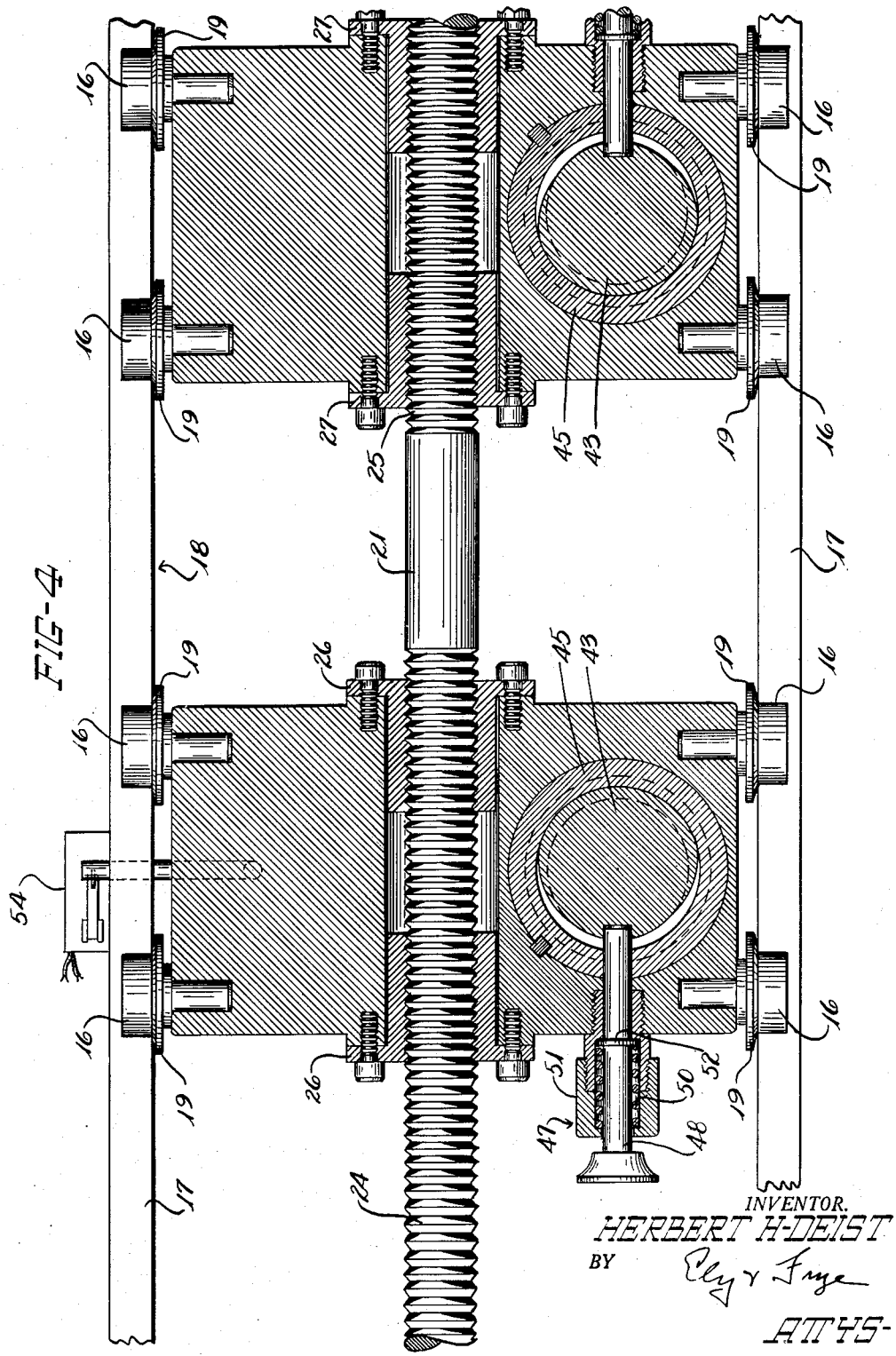

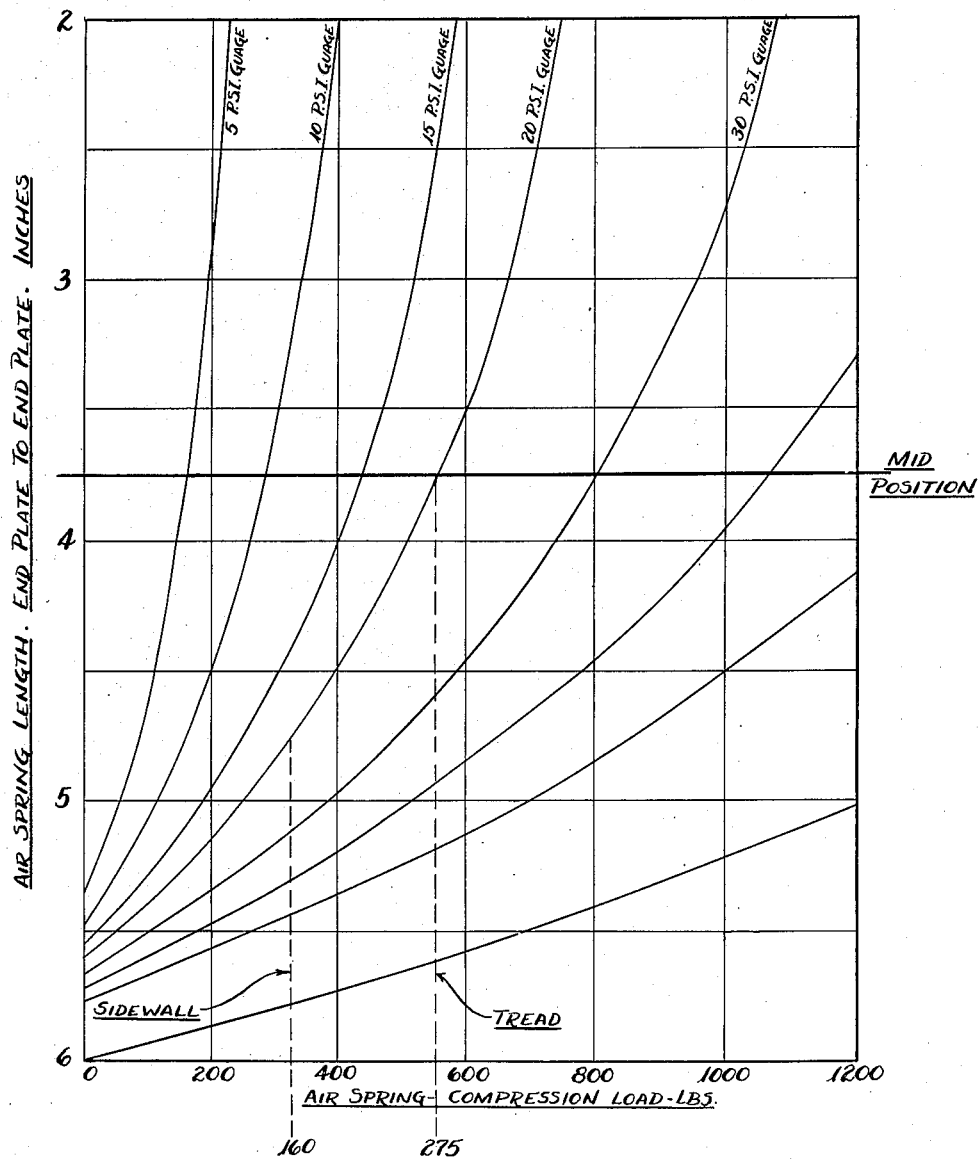

2,685,909

UNITED STATES PATENT OFFICE 2,685,909

TREAD STITCHER FOR TIRE MACHINE ASSEMBLY

Herbert H. Deist, Akron, Ohio, assignor to The Firestone Tire & Rubber Company, Akron, Ohio, a corporation of Ohio Application December 3, 1951, Serial No. 259,589

2 Claims. (Cl. 154—9)

This invention relates to tire building machines and more particularly to improved tread stitching devices associated with such machines.

Tread stitchers usually comprise a pair of discs or wheels which are rolled against a tire after it is built on a building drum. The discs contact the tire in tight spiral paths leading from the center of the tread outwardly to the bead portions, the spirals resulting from opposite traversing movements of the discs while the drum is rotated. In this manner much of the air which is trapped within the body of a tire is expelled, and a firm cohesion of the various elements of the tire is secured.

It is desirable in the stitching operation to exert a considerable stitching force upon the tread portions but a considerably smaller stitching force upon the side walls. This is necessary because the tread portions are thick and much of the stitching force is absorbed in compression of the tread before it is transmitted to the tread-carcass interface, while the side walls are relatively thin and do not require much force in order to obtain the desired results. In addition, if excessively large stitching forces are applied to the side walls, there is a tendency to push the material ahead of the stitcher blades and distort the sidewalls.

Heretofore, the force which the stitcher exerts upon the tire has been produced either by mechanical springs or by means of a hydraulic piston and cylinder arrangement. In neither case is it possible to obtain the desired predetermined loads upon the stitchers.

Where mechanical springs are used, the force exerted by any of the springs can follow only a single, fixed, load-deflection curve which is peculiar to that spring. As a result, there is no control over the stitching forces, and no possibility of adjusting those forces for different tires. There is no assurance that the load-deflection curve of the spring will be suitable for stitching a single tire much less a whole range of tire contours and sizes. Where air cylinders are used to load the stitchers, the forces exerted will be substantially constant for any given air pressure with the forces exerted upon the side walls being equal to those exerted upon the tread. As pointed out above, it is unnecessary and undesirable to apply heavy forces to the side walls of a tire. Moreover, an air cylinder will not follow the same load-deflection curve in repeated trials, and hence it cannot be accurately calibrated.

The forces exerted by air cylinders are variable because of friction within the cylinders, because of leakage, and because the cylinders tend to stick if there is any lateral force exerted upon the stitchers; moreover, air cylinders require excessive maintenance.

All of these difficulties and disadvantages are overcome by providing a stitcher in which a bellows arrangement is used to produce the required forces. The bellows will exert uniform and equal loads on each of the stitcher discs, and the loads may be accurately determined and maintained simply by controlling the air pressure which operates the bellows. There is no tendency for the bellows to stick, and the bellows are free from the problem of leakage and friction.

Bellows, moreover, have load-deflection curves which are desirable for use in stitching tires, for the exerted force falls off substantially as the bellows are extended so that the side walls of the tire are subjected to considerably less stitching pressure than the tread. Moreover, the load-deflection curve for the bellows will vary with the air pressure within the bellows so that a whole set of load-deflection curves corresponding to a set of different air pressures can be obtained. All that is necessary in stitching tires is to select the air pressure which has the load-deflection curve capable of the desired stitching performance. The stitching forces may be controlled independently of the diameters of the tire building drums with which the stitchers are used and independently of the tires being stitched merely by selecting the proper working air pressure.

The general object of the invention, therefore, is to provide tread stitchers which are loaded by means producing accurately predetermined loads. Another object of the invention is to provide pneumatic stitcher means having a set of load-deflection curves corresponding to a set of different air pressures applied to the means. Another object is to provide loading means for stitchers which are rugged and serviceable, which have a low initial cost, which may be easily and cheaply installed, and which require a minimum of maintenance. Further objects and advantages of the invention will appear from the following description of a preferred form of the invention, reference being had to the accompanying drawings in which:

Figure 3 is a view partly in section showing the manner in which the stitchers are given vertical adjustment, the section being taken in the plane indicated by the lines 3—3 of Figure 2;

Figure 4 is a section taken in a horizontal plane indicated by the lines 4—4 of Figure 3 showing further details of the manner in which the stitchers are mounted; and Figure 5 is a chart showing the relation between bellows extension and the force exerted by the bellows, this relation being shown for a number of different operating air pressures within the bellows.

Figure 1:
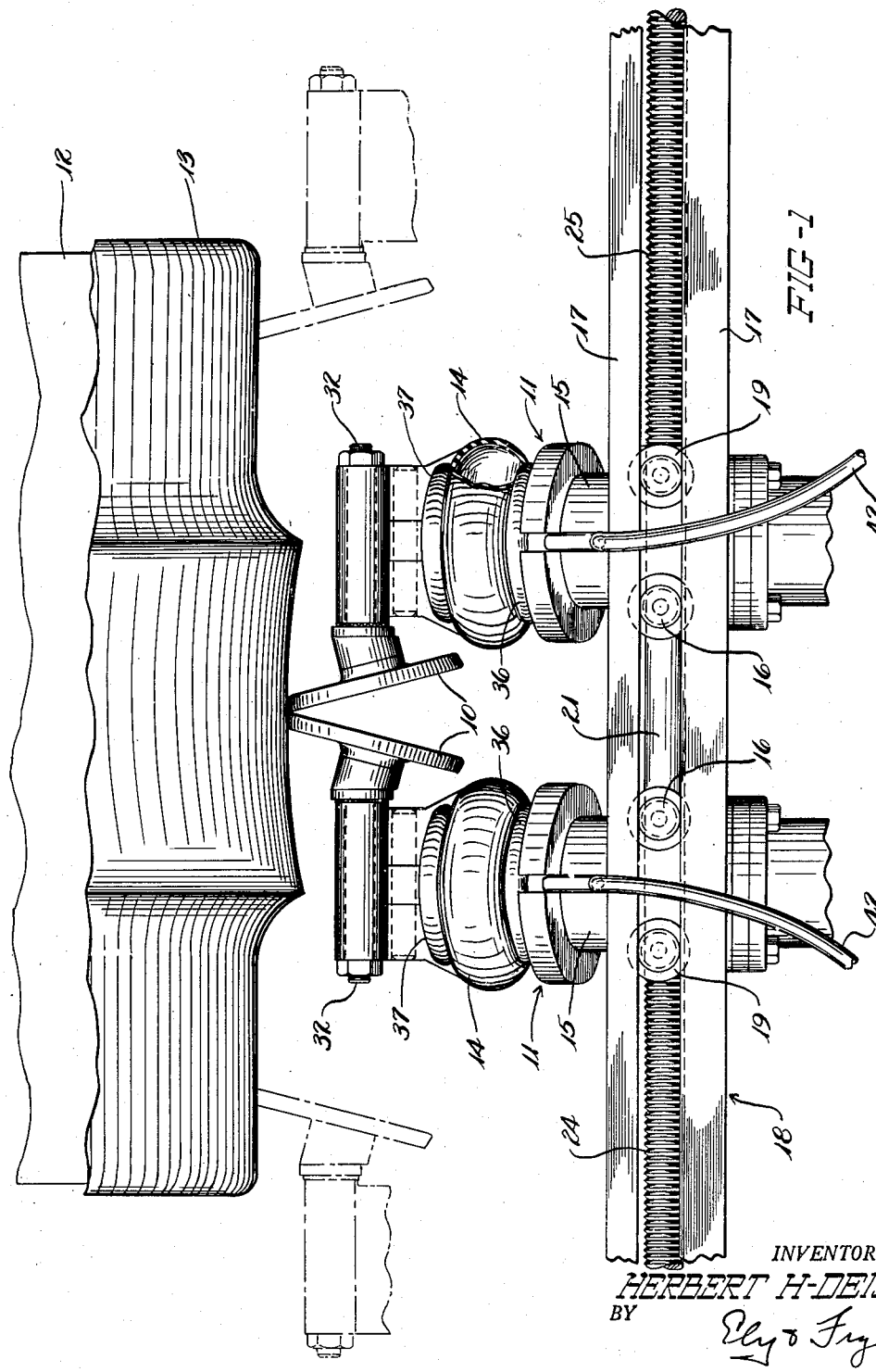
Figure 1 is a front elevation showing the essential parts of the invention in association with a tire building drum.

A tread stitcher embodying a preferred form of the invention comprises a pair of rotatable discs 10 which are mounted respectively on carriages indicated generally at 11 which are positioned beneath a tire building drum 12 and which are adapted to have traversing movements in opposite directions from the center outwardly to the ends of the drum. This movement is indicated in Figure 1 where the stitchers are shown in solid lines in their position at the beginning of the stitching operation and in which the stitchers are shown in dotted lines in a position approaching the end of the stitching operation. The stitchers 10 are urged into contact against the tire 13 throughout their traversing movements by bellows 14 which have a predetermined air pressure therewithin. At the end of the traversing movement, the air pressure is reduced to withdraw the stitchers from contact with the tire, and the stitchers are then returned to their initial position beneath the center of the building drum in readiness for their next traversing stitching movement. As noted above, the discs contact the tire 13 in tight spiral paths and thus compress the elements of the tire together in a coherent structure.

The carriages 11 on which the stitching discs are mounted are supported in a manner which enables them to support the stitching discs and at the same time have a free, traversing movement. Thus, each carriage comprises a body portion 15 which is supported by rollers 16 which rest upon the rails 17 of a supporting frame indicated generally at 18. Four such rollers are provided for each carriage, see Figure 4, to provide adequate support. The flanges 19 of the rollers have rolling contact with the sides of rails 17 to hold the carriages securely against movement in a direction at right angles to the axis of the building drum.

The traversing movement of the carriages is provided by a central jack shaft 21 which is journaled as at 22 and 23 in the frame 18. The jack shaft has two threaded portions 24 and 25 which are opposite in pitch and which cooperate respectively with threaded nuts 26 and 27 of like pitch which are secured to the carriages; see Figure 4. The shaft 21 is driven by appropriate means which as illustrated includes the reversing motor 28 and the gears 29 and 30. When the motor is driven in one direction, the two carriages will be moved away from each other by the opposite threaded portions 24 and 25, and when the motor is reversed, the carriages will move together to the position of Figure 1.

Figure 2:
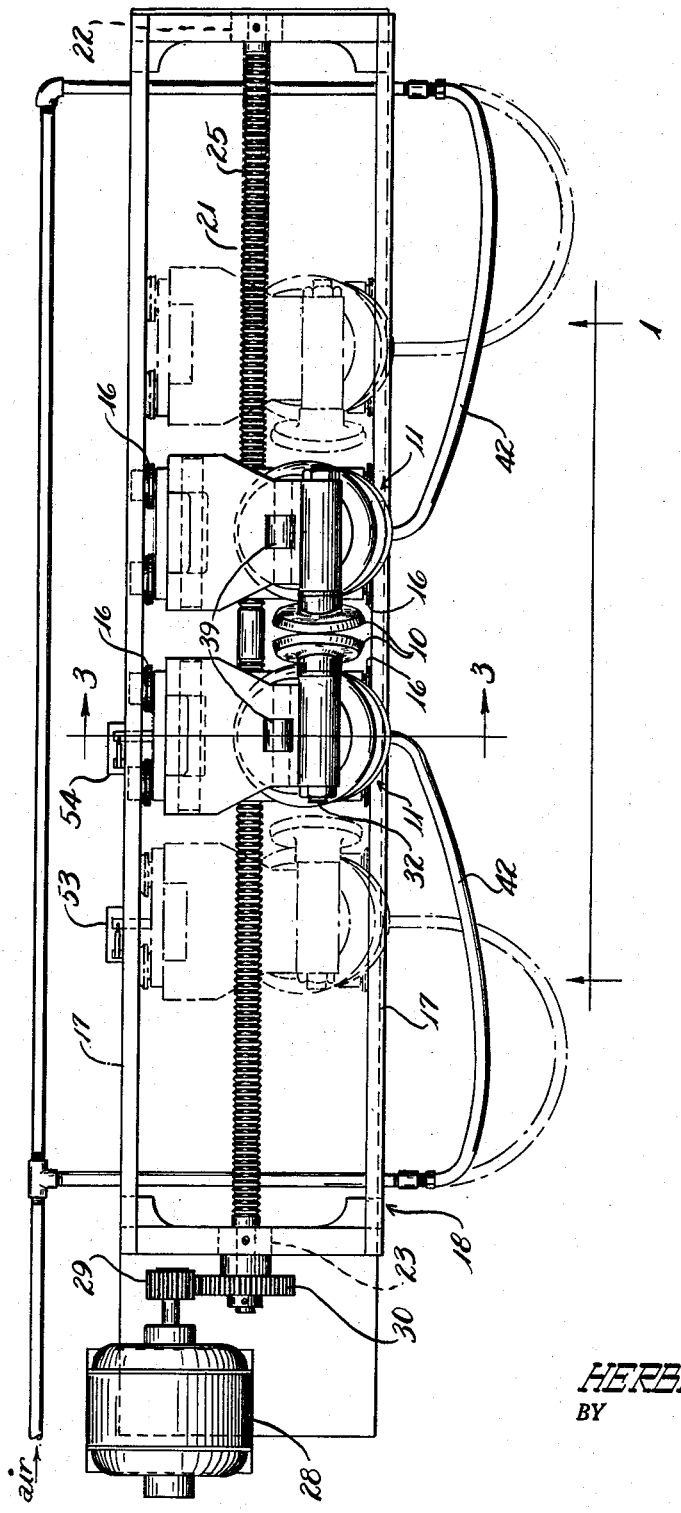
Figure 2 is a top elevation of the apparatus of Figure 1 showing in addition the driving mechanism which produces the traversing movement of the stitchers.

The stitcher discs 10 are mounted on the carriages 11 in a manner to minimize the lateral instability of the bellows 14. Thus, it will be noted from Figures 1 and 3 that the discs are journaled on axles 32 which are supported by arms 33 which are pivoted as at 34 to the head portions 35 of the carriages. The bellows 14 are mounted on the carriage heads 35 in the manner shown in Figure 3 with the bottom plates 36 of the bellows secured to the top of the heads and with the top plates 37 pivotally connected at 38 to the supporting arms 33 by brackets 39. When air under pressure is introduced into the bellows 14 through flexible conduits 42, the bellows will expand and rock the arms 33 upwardly in a counter-clockwise movement as viewed in Figure 3 to bring the stitcher discs forcibly into contact with the tire. When the air pressure in the bellows is released, the bellows will contract and bring the stitcher discs downwardly out of contact with the tire. The conduits 42 are flexible and of sufficient length to permit the stitcher carriages to make their full traversing movement, see Figure 2.

The head portions 35 of the carriages can be vertically adjusted within wide limits to enable the stitcher to be used with building drums of widely varying diameter. This vertical adjustability compensates for the limited extensibility of the bellows, although if desired, the bellows may have enough sections to provide the required expansion. In addition, the vertical adjustment of the bellows will bring the operating range of the bellows within the desirable portion of the load-deflection curve for a given air pressure. Thus, in Figure 3, the apparatus is shown for use with a tire building drum of large diameter. If the same apparatus were to be used with a drum of smaller diameter, the stitching heads 35 would be raised upwardly to enable the bellows to exert the desired force without reaching their limit of extension. While any manner of vertical adjustment may be provided, that illustrated in Figure 3 has been found to be practicable. As shown, the heads 35 have depending screws 43 which are received within bores 44 of the carriages, and the carriages have nuts 45 cooperating with screws 43. In order to raise a stitching head, the head is rotated bodily 360° and in so doing is lifted a distance depending on the characteristics of its lifting screw. In order to hold the heads against lateral movement, the screws have cylindrical extensions 46 which have a snug, sliding fit within the bores 44 of the carriages.

The heads are secured against accidental rotation by detents 47, each detent comprising a pin 48 which extends within a vertical groove 49 in the screw 43 to lock it in position. The pin is urged into locking position by a coil spring 50 confined between a detent housing 51 and a washer 52 secured to the pin. The detents 47 must, of course, be pulled outwardly clear of the screws when the stitching heads are given their vertical adjustment.

The arrangement is simple in construction and operation. When the operator has finished building a tire 13 on the drum and is ready for stitching, he operates a switch which passes air under the desired pressure into the bellows. The arms 33 swing upwardly, and the discs 10 are pressed into contact with the tire with the full force of the bellows. It is possible to determine what stitching force is exerted upon the tire at any instant by reference to a calibration chart such as that shown in Figure 5 in which is shown a set of load-deflection curves for a particular bellows, there being an individual curve for each air pressure within the bellows. In the chart the exerted force is plotted as the abscissa and the bellows extension as ordinate for each air pressure in the bellows. The fact that the bellows has such a range of adjustment provides great flexibility in the stitching operation, for the vertical adjustment of the bellows bodily enables a particular range of bellows extensibility to be obtained for any operating air pressure. The forces are virtually unmodified by the effects of friction, leakage, etc. and will remain uniform and accurate under all normal conditions.

A short time after the discs contact the center of the tire tread, the motor 28 is energized to drive shaft 21 and the carriage 11 in their stitching movement. When the carriages reach the end of the drum, one of the carriages will trip a limit switch 53, see Figures 2 and 3, and terminate the outward movement of the carriages; the air pressure in the bellows will be released; the stitcher arm 33 will drop down; and the motor 28 will be reversed to drive the carriages back to their original position. When the carriages reach their original position, a second switch 54 will be tripped, and the apparatus will be ready for its next cycle of operation.

Reverting once again to Figure 5, it will be seen that the extension of the bellows in inches, indicated as air spring length, is plotted against the load in pounds exerted by the bellows alone, entitled air spring compression load. This relationship is plotted for various air pressures within the bellows. The chart is used as follows. For example, if experience has shown that a stitching force of about 275 pounds is desirable for the tread and a stitching force of about 150–160 pounds is desirable for the sidewall, such stitching loads can be obtained by using an air pressure in the bellows of 20 p. s. i. as indicated by the dotted lines in the chart; the actual loads of 160 and 275 being obtained by virtue of the ratios of lever arms in the apparatus which reduce the bellows force in the ratio of 2:1. Such loads are obtained when the tread is about an inch thicker than the sidewall. If the same loads should be desired for a tire in which the tread is only about ½ inch thicker, 30 pounds of air pressure can be used, and the range of bellows extension used would be from about 4.6 to 5.2 inches. Similar variations in thickness can be accounted for by selecting different air pressures. Again if a tread stitching pressure of 400 pounds and the same sidewall stitching force of 160 pounds should be desired, a pressure of 35 p. s. i. would be selected, and the operating range of the bellows extension would be from about 4.2 inches to about 5.3 inches. It will be apparent from the chart that the use of a bellows affords a flexibility of performance not obtainable by other means.

Various modifications are, of course, possible within the scope of the invention. For example, instead of the rollers 16 and rails 17 which support the carriages, the carriages may be supported by shoes sliding on appropriate ways; and instead of the vertical adjustment of the stitching heads alone, the whole apparatus may be bodily adjusted in vertical position in order to adapt the apparatus to various size drums.

Further modifications will no doubt occur to those skilled in the art within the scope of the invention, the essential features of which are summarized in the appended claims.

What is claimed is:

1. A tire building machine comprising a tire building drum, a stitching apparatus frame, a pair of carriages supported by said frame, means to move said carriages simultaneously in opposite directions along said drum, a stitching head mounted on each of said carriages, an arm pivoted to each stitching head at one end of each of the arms, each arm carrying at the other end of said arm a stitching disc journalled for idling rotation, each said arm being movable in an arcuate path about its pivot, and a fluid-pressure-extensible, flexible-walled bellows mounted on each said carriage with one end of each bellows attached to its carriage and the other end of each said bellows being attached to its arcuately movable arm, each bellows when extended by fluid pressure exerting a force to move each said arm in said arcuate path with respect to said carriage and to press said idling disc into contact with a tire on said tire building drum.

2. In a tire building machine, a tire building drum, a stitcher carriage mounted for movement relative to the drum, an arm pivoted to said carriage for arcuate movement with respect to said carriage and said drum, a stitching disc journalled on said arm remote from said pivot, and a fluid pressure-extensible bellows having one end thereof mounted on said carriage and the other end mounted on said pivoted arm remote from said pivot for moving said stitching disc toward and from said tire building drum in an arcuate path and for forcing said stitcher into contact with a tire on said drum.

References Cited in the file of this patent

UNITED STATES PATENTS

| Number | Name | Date |
|---|---|---|
| 1,981,828 | Shook | Nov. 20, 1934 |
| 2,161,117 | Wikle | June 6, 1939 |
| 2,208,539 | Brown | July 16, 1940 |
| 2,224,821 | Humphrey | Dec. 10, 1940 |
| 2,381,379 | Stevens | Aug. 7, 1945 |
| 2,382,958 | Burgoine et al. | Aug. 21, 1945 |
| 2,581,933 | Stevens | Jan. 8, 1952 |